(12) United States Patent
Kaplan et al.

(10) Patent No.: US 11,549,212 B2
(45) Date of Patent: Jan. 10, 2023

(54) METHOD FOR PROVIDING AN ANTI-MICROBIAL AND AN ANTI-PILLING EFFECT AND FOR IMPROVING DYE UPTAKE TO TEXTILES, NOVEL CO-POLYMERS AND TEXTILES

(71) Applicant: Sanko Tekstil Isletmeleri San. Ve Tic. A.S., Inegol-Bursa (TR)

(72) Inventors: Gökhan Kaplan, Inegol-Bursa (TR); Leyla Zengi, Inegol-Bursa (TR); Semih Kazanç, Inegol-Bursa (TR); Mustafa Zeyrek, Inegol-Bursa (TR)

(73) Assignee: Sanko Tekstil Isletmeleri San. Ve Tic. A.S., Inegol-Bursa (TR)

( * ) Notice: Subject to any disclaimer, the term of this patent is extended or adjusted under 35 U.S.C. 154(b) by 116 days.

(21) Appl. No.: 16/434,907

(22) Filed: Jun. 7, 2019

(65) Prior Publication Data
US 2019/0375869 A1 Dec. 12, 2019

(30) Foreign Application Priority Data

Jun. 11, 2018 (EP) .................................... 18176916

(51) Int. Cl.
| | | |
|---|---|---|
| *D06M 16/00* | (2006.01) | |
| *A01N 37/02* | (2006.01) | |
| *C08F 220/34* | (2006.01) | |
| *C09D 5/14* | (2006.01) | |
| *C09D 133/14* | (2006.01) | |
| *D06N 3/04* | (2006.01) | |
| *D06P 3/60* | (2006.01) | |
| *D06P 5/00* | (2006.01) | |

(52) U.S. Cl.
CPC ............ *D06M 16/00* (2013.01); *A01N 37/02* (2013.01); *C08F 220/34* (2013.01); *C09D 5/14* (2013.01); *C09D 133/14* (2013.01); *D06N 3/04* (2013.01); *D06P 3/60* (2013.01); *D06P 5/002* (2013.01); *D06N 2209/1671* (2013.01)

(58) Field of Classification Search
CPC ......... C08F 220/34; A01N 37/02; C09D 5/14; C09D 133/14; D06N 3/04; D06N 2209/1671; D06P 3/60; D06P 5/002
See application file for complete search history.

(56) References Cited

U.S. PATENT DOCUMENTS

| | | | |
|---|---|---|---|
| 2010/0003212 A1* | 1/2010 | Kis .................. | A01N 33/12 424/78.27 |
| 2017/0065013 A1* | 3/2017 | Choudhry ............. | D06M 13/00 |

FOREIGN PATENT DOCUMENTS

EP 1 354 935 10/2003

OTHER PUBLICATIONS

Kazanc et al. Multi-Functional Textile Coatings BAsed on Polymeric Materials. Marmara Journal of Pure and Applied Sciences, 2015, Special Issue-1, 49-52.*
European Search report issued by the EPO for priority EP application No. 18176916.7 dated Nov. 29, 2018.
International Search report issued by the EPO for PCT/EP2019/065056 dated Jul. 12, 2019.
Kazanc et al. : "Multi-Functional Textile 1-12, 16, Coatings Based on Polymeric Mate", Marmara University Journal of Science, vol. 27, No. 3, 2015, XP055525400.
International Preliminary Report on Patentability issued by WIPO for PCT/EP2019/065056 dated Dec. 15, 2020.

* cited by examiner

*Primary Examiner* — Amina S Khan
(74) *Attorney, Agent, or Firm* — Silvia Salvadori

(57) ABSTRACT

The present invention relates to a method for providing an anti-microbial and an anti-pilling effect to textiles and for improving dye uptake to textiles. The invention also relates to novel co-polymers to be used in the method of the invention and to novel textiles.

7 Claims, 2 Drawing Sheets

METHOD FOR PROVIDING AN ANTI-MICROBIAL AND AN ANTI-PILLING EFFECT AND FOR IMPROVING DYE UPTAKE TO TEXTILES, NOVEL CO-POLYMERS AND TEXTILES

This application is a U.S. Non-Provisional application which claims priority to and the benefit of European Patent Application no. 18176916.7 filed Jun. 11, 2018, the content of which is incorporated herein by reference in its entirety.

TECHNICAL BACKGROUND

Antimicrobial, especially antibacterial textiles are known in the art, which are usually prepared by applying antimicrobial substances to said textiles or to yarns. Said antimicrobial substances must of course be non-toxic and non-allergenic to human skin.

Currently antimicrobial substances are generally selected from quaternary ammonium compounds (QACs), triclosan, metal ions, oxides, some inorganic compounds and salts (such as Ag, TiO2, Cu, Ni, Pd, Ag(I), Pd(II) complexes) and natural polymers (such as chitosan, chitin).

Among above mentioned compounds QACs are widely used, for instance on cotton, polyester, nylon and wool. The antimicrobial effect of QAC's highly depends on length of alkyl chain and the number of cationic ammonium groups.

It is easy to understand that the applied antimicrobial substance must show a strong attachment to textiles especially because for some industrial textiles manufacturing process, such as denim, washing is an inevitable stage of garment production.

At present, the available antimicrobial substances do not meet the essential stability requirement and easily leach from textile surfaces and/or show hydrolytic instability and/or decrease their antimicrobial activity over time and/or make the tensile strength of the textiles decrease.

Kazanc et al. (Marmara Journal of Pure and Applied Sciences, 2015, Special issue-I:49-52) disclose polyurethanes obtained by co-polymerization of monomers bearing hydroxy functions and monomers bearing quaternized tertiary amine moieties, and the subsequent cross-linking of the hydroxy functions present in the co-polymer with isocyanates to form polyurethane films. Said films, which are insoluble as reported in the document, are applied onto non-dyed indigo fabrics to the surface of which they adhere by positive-negative charge interaction between the quaternized ammonium functions and the negatively charged indigo molecules. Said interaction however is weak and the applied coating leaches away upon use and washing.

Pilling is a common flaw of textiles caused for instance by wear and washing, which provoke the loosing of the fibers over time. Pilling represents an important problem to be solved in the textile field.

There is therefore a need for novel antimicrobial substances which overcome the shortcomings of the prior art, such as those disclosed above and, hopefully, provide the textiles with further interesting and useful properties, such as anti-pilling effect and others.

OBJECTS OF THE INVENTION

It is a first object of the invention to provide a method for providing an anti-microbial and an anti-pilling effect and for improving dye uptake to textiles, by means of a treatment with known and novel co-polymers and diisocyanates.

It is another object of the invention to provide novel co-polymers and their use in the method of the invention as well as textiles, garments and yarns deriving from said method.

It is further object of the invention to provide textiles, preferably denim, wherein the hydroxy groups on said textiles are covalently linked to said known and novel co-polymers by means of a urethane bridge.

These and other objects are achieved by the invention as disclosed and claimed in the present application.

DESCRIPTION OF THE INVENTION

According to one of its aspects, the present invention relates to a method for providing an anti-microbial and an anti-pilling effect and for improving dye uptake to a textile, said method comprising:
(i) treating said textile with an aqueous solution comprising
   a) at least one co-polymer made of a monomer of general formula (I)

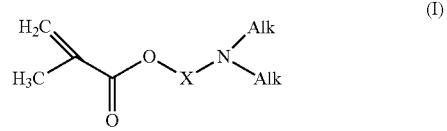

or mixture thereof,
and a monomer of general formula (II)

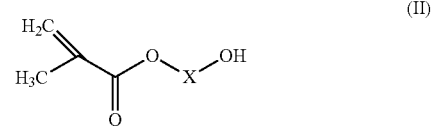

or mixture thereof,
wherein
   X is, each independently selected from the following (A) or (B) chains

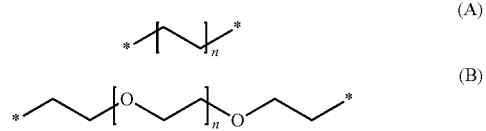

the stars indicate the bonds linked to the oxygen and nitrogen atoms in the monomers of formula (I) and formula (II);
   n is, each independently, an integer from 1 to 10; and
   Alk is a $C_1$-$C_4$ alkyl group;
   and wherein the tertiary amino groups in formula (I) are optionally partially quaternized with halo-long chain alkyl groups;
and
   b) at least one aliphatic or cycloaliphatic diisocyanate;
and
(ii) optionally drying and/or fixing said textile.

According to a preferred embodiment, the method of the invention is characterized by the fact that the copolymer (a)

and the textile are at least partially covalently linked by urethane bridges provided by the aliphatic or cycloaliphatic diisocyanate (b).

According to the method of the invention, the treatment of a textile with the components (a) and (b) above forms an urethane bridge between the free hydroxy groups in the monomer of general formula (II) and the free hydroxy groups present in said textile, as shown in FIG. 1.

The term "Alk" herein indicates a linear or branched, saturated $C_1$-$C_4$ alkyl group, preferably a linear alkyl group, more preferably a methyl or an ethyl group, methyl being particularly preferred.

According to a preferred embodiment, n is an integer from 1 to 8, for instance 1, 2, 3 or 4, more preferably n is 1 or 2, advantageously n is 1.

The expression "wherein tertiary amino groups in formula (I) are optionally partially quaternized with halo-long chain alkyl groups" means that quaternized ammonium groups may be present in the co-polymer which is achieved by reaction of the co-polymer with halo-long chain alkyl groups, so that the resulting monomer of formula (I) is a monomer of formula (I')

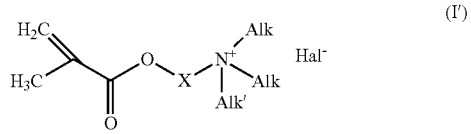

wherein X and Alk are as above defined, Alk⁻ is a $C_6$ to $C_{22}$ alkyl group, preferably a $C_8$ to $C_{20}$ alkyl group, such as for instance $C_{10}$, $C_{12}$, $C_{14}$, $C_{16}$ or $C_{18}$, and Hal⁻ indicates a halogen counter ion, such as a Br⁻ or a Cl⁻, preferably a Br⁻.

The expression "aliphatic or cycloaliphatic diisocyanate" is self evident for the skilled in the art, and herein preferably includes hexamethylene diisocyanate, isophorone diisocyanate and methylene-bis(4-cyclohexylisocyanate), hexamethylene diisocyanate being particularly preferred. Other diisocyanates may however be used in the method of the invention, provided that they are able to create an urethane bridge reacting with the hydroxy groups of the co-polymer and the hydroxy groups of the textile.

According to the invention, the diisocyanate may be a blocked diisocyanate, such as a diisocyanate blocked with dimethyl pyrazole, caprolactame, butanone oxime, 1,2-pyrazole, 1,2,4-triazole, diisopropylamine, 3,5-dimethylpyrazole and diethyl malonate. Blocked diisocyanate are known in the art and the skilled man is perfectly able to select the appropriate one to carry out the method of the invention.

The above mentioned monomers and compounds are known to the art, or they can be prepared according to known and conventional processes.

The term "textile" herein indicates any material suitable to prepare fabrics and garments, and includes fibers, filaments, yarns, fabrics, ready for dyeing fabrics and any textile articles, such as for instance garments, clothes and fabric based articles. The expression "ready for dyeing fabrics" means a fabric which has undergone the desizing, mercerization (or bleaching) and washing steps.

According to a preferred embodiment, the textile of the invention are indigo textiles, such as denim.

According to a preferred embodiment, the monomer of formula (I)/monomer of formula (II) molar ratio is about 95-85/5-15, preferably about 90/10.

According to a preferred embodiment, 20-40% of the tertiary amino groups are quaternized in the co-polymer, most preferably about 30%.

Preferably only one type of monomer of formula (I) and only one type of monomer of formula (II) are present in the co-polymer.

Preferably only one type of diisocyanate is used in the method of the invention.

According to a preferred embodiment, the invention relates to a method for providing an anti-microbial and an anti-pilling effect to a textile, such as above defined, said method comprising coating said textile with an aqueous solution comprising
a') at least a co-polymer of 2-(dimethylamino)ethyl methacrylate (DMAEMA) and 2-hydroxyethyl methacrylate (HEMA) said co-polymer, optionally being quaternized with halo-long chain alkyl groups; and
b') at least one aliphatic or cycloaliphatic diisocyanate;
to form a urethane bridge between the free hydroxy groups in HEMA and the free hydroxy groups present in said textile. DMAEMA has the following chemical formula (I')

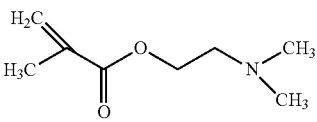

HEMA has the following chemical formula (II')

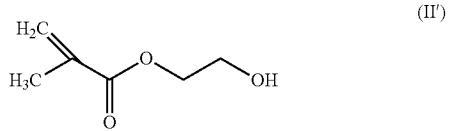

According to a preferred embodiment, the DMAEMA/HEMA molar ratio is about 95-85/5-15, preferably about 90/10.

According to a preferred embodiment, 20-40% of the tertiary amino groups are quaternized as disclosed above, most preferably about 30%.

The above preferred embodiments of the method above disclosed also apply to the method involving DMAEMA and HEMA above.

Besides the co-polymers (a) and the diisocyanates (b) as above defined, the aqueous solution used in the method of the invention (herein also "coating composition") may further comprise other components, such as for instance, wetting agents and thickeners, such as for instance commercial wetting agents, i.a. those presently marketed under the commercial names Leonil KS, Mersitol 2334 AQ, Mercerol QWLF which are preferably used about 1% (vol) with respect to the total volume of the solution and/or commercial thickeners such as those presently marketed under the commercial names Pirusulan DCA 24 ST, Pirusulan DCA 130 which are used to adjust the viscosity preferably between 20-24 d.cP.

The term "coating" herein indicates any possible application of a solution on a textile and includes, but is not limited to, padding, dipping, printing and the like.

After the application of an aqueous solution above to the textile, the coated fabric is dried, for instance by heating, the temperature depending on the type of textile. For instance, for denim, the drying step may be made at 100-160° C., such as 150° C., for some minutes. The coated textile may also be fixed, for instance at higher temperatures, such as 170-190° C. for one or more minutes.

According to a preferred embodiment, the co-polymer concentration in the aqueous solution is from about 2 to about 15 g/L.

With the method of the invention, it was surprisingly found that when the aqueous solution comprising the co-polymer (a) and the diisocyanate (b) (or (a') and (b')), as above defined, is applied to a textile, the diisocyanate molecule reacts either with the hydroxy groups present in the co-polymer and the hydroxy groups present on the textile surface, thus creating urethane bridges which covalently bind the co-polymer to the textile.

It results a stable co-polymer coating on the textile, which does not leach even after multiple washings (both industrial, such as stone wash and home laundry washings).

This co-polymer coating provides for very interesting effects, such as an anti-microbial effect, thanks to the presence of quaternized ammonium groups, and also anti-pilling effect.

It has also been observed that the co-polymer coating of the invention allows to obtain darker shades which can be obtained thanks to an increased dye uptake activated by the co-polymer coating.

The reaction for the preparation of the co-polymer of the invention may be carried out according to Kazanc et al., Marmara Journal of Pure and Applied Sciences, 2015, Special issue-I:49-52. As said in this paper, pre-formed insoluble polyurethane films comprising HEMA/DMAEMA copolymers crosslinked with aliphatic isocyanates, are applied onto non-dyed indigo fabrics to the surface of which they adhere by positive-negative charge interaction. Contrary to that, the method of the present invention involves the application of a water solution comprising a DMAEMA/HEMA copolymer and isocyanates on a textile, to obtain a coating which is at least partially covalently linked to the textile by urethane bridges.

A possible alternative process is disclosed in the Experimental Section which follows.

According to another of its aspects, the invention relates to novel co-polymers made of DMAEMA and HEMA, characterized in that the molar DMAEMA/HEMA ratio is 95-85/5-15, preferably about 90/10, and 20-40% of the tertiary amino groups are quaternized with a substituent (C) as above defined, most preferably about 30%.

According to another of its aspects, the invention relates to the use of at least one co-polymer, as herein defined, in the coating of textiles according to the method of the invention, preferably, the use of the novel co-polymers of the invention.

According to another of its aspects, the invention relates to the use of an aqueous solution comprising at least one co-polymer as herein defined, including novel co-polymers of the invention and at least one aliphatic or cycloaliphatic diisocyanate as herein defined in the coating of textiles according to the method of the invention.

According to another of its aspects, the invention relates to the use of an aqueous solution comprising at least one co-polymer as herein defined, including novel co-polymers of the invention and at least one aliphatic or cycloaliphatic diisocyanate as herein defined, (herein also "coating composition") for providing an anti-microbial and anti-pilling effect to textiles, as herein defined.

According to another of its aspects, the invention relates to the use of an aqueous solution comprising at least one co-polymer as herein defined, including novel co-polymers of the invention and at least one aliphatic or cycloaliphatic diisocyanate as herein defined, for improving dye uptake of a textile as herein defined, so that darker shades can be obtained. Preferably, the textile is a denim.

According to another of its aspects, the invention relates to textiles, preferably denim, fabrics and garments, yarns treated by the method of the invention.

According to another of its aspects, the invention relates to textiles, preferably denim, wherein the hydroxy groups on said textiles are at least partially covalently linked to a co-polymer made of at least a monomer of formula (I) or (I') and at least a monomer of formula (II) or (II'), as above defined, by means of a urethane bridge.

According to a preferred embodiment, the invention relates to textiles, preferably fabrics and garments, particularly denim fabrics and garments, wherein the hydroxy groups on said textiles are at least partially covalently linked to a co-polymer made of at least a monomer of formula (I) or (I') and at least a monomer of formula (II) or (II'), as above defined, by means of a urethane bridge, said urethane bridge being generated by at least one aliphatic or cycloaliphatic diisocyanate, as herein defined.

Experimental tests have been carried out to show the anti-microbial effect of the coating of the invention. Details are given in the Experimental Section which follows.

The anti-pilling effect has been evaluated by experts with a method for anti-pilling effect detection and measurement. In this method, the coating composition showed very interesting results.

The following Experimental Section illustrates representative embodiments of the invention, without limiting it.

EXPERIMENTAL SECTION

Example 1

Preparation of the Co-Polymer

A monomer solution containing 100 mmol HEMA and 900 mmol DMAEMA is prepared and 10% of (v/v) said solution is added the reactor that is set 70° C. Then, 50 ml of distilled water is added in the reactor and stirred while monomer mixture, ammonium persulfate (22 g of ammonium persulfate is dissolved in 100 ml of water), and sodium metabisulfate (19 g sodium metabilsulfate is dissolved in 100 ml of water) solutions are being fed with the 2 ml/min rate. The co-polymer is collected from the reactor and washed with hot water (70-80° C.) to remove unreacted monomer, ammonium persulfate and sodium metabisulfite.

Example 2

Quaternizing Process 25-30% of DMAEMA residues present in the co-polymer of Example 1 were quaternized with alkyl halides by following procedure: 50 g of the co-polymer is dissolved in 300 ml dry ethanol, and 75 mmol of an alkyl halide, preferably 1-bromodecane, is added, then the solution is stirred for 24 hour at room temperature. Ethanol is evaporated to collect the quaternized co-polymer by a conventional work-up step.

Example 3

Coating Process

A coating solution is prepared with water, the quaternized co-polymer of Example 2, hexamethylene diisocyanate, a wetting agent and a thickener according to the following: 2.5 g of quaternized co-polymer (10% of HEMA in co-polymer) is dissolved in 1 L of water with 50-75 mg of the diisocyanate, 6-8 g of wetting agent, and an amount of thickener which allows a 20-24 d.cP viscosity. The solution is then applied onto the fabric. This can be made for instance by coating or impregnation. In coating method, it is useful to add a thickener to the solution in order to have desired viscosity, whereas in impregnation process a thickener is not necessary. A sanforizing machine can also be used for applying the solution to the fabric. The coated fabric is dried at 150° C. for about 3 minutes and subsequently fixed at 170° C. for about 1 minute.

Example 4

Anti-Microbial Effect

The anti-bacterial effects of the co-polymer of Example 2 and the fabrics coated therewith were tested according to ASTM E2149-01 on:

ATCC 35218 (*Escherichia coli*)
ATCC 6538 (*Staphylococcus aureus*)

Figure 1:
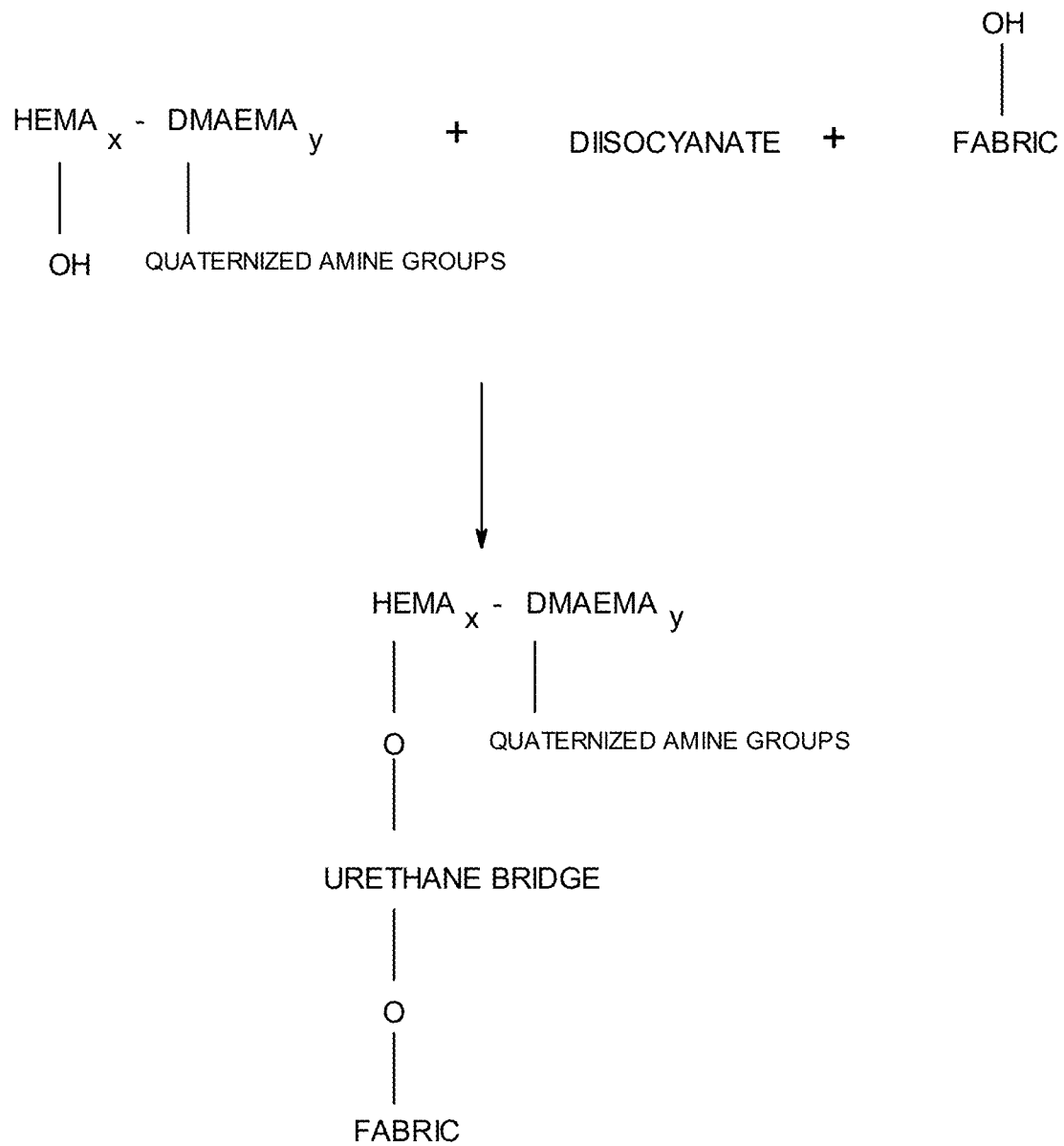
FIG. 1 shows a schematic representation of the reaction which occurs in the method of the invention, wherein n and m represent the number of monomers present in the co-polymer.
Figure 2B:
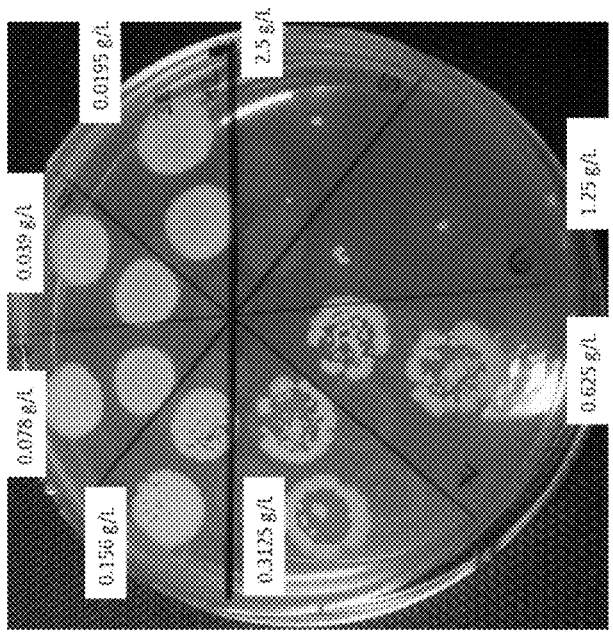
FIGS. 2A and 2B show the anti-microbial effect of a representative quaternized co-polymer of the invention.
Figure 2A:
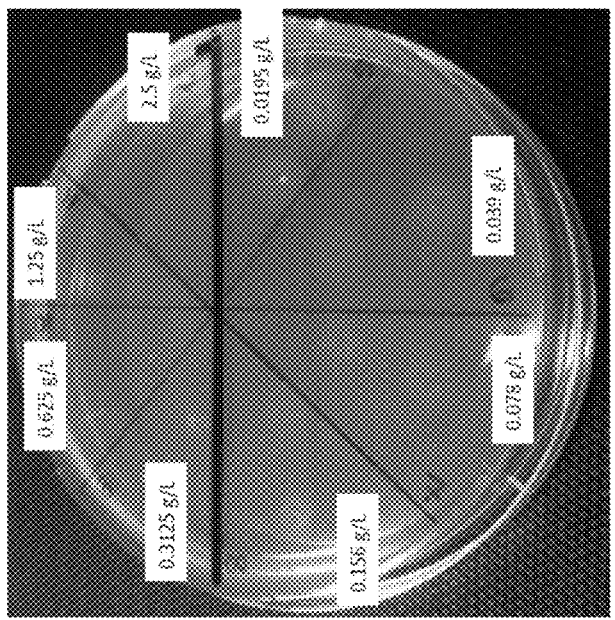

The results showed that, the quaternized co-polymer of Example 2 shows an antimicrobial effect against *Staphylococcus aureus* and *Escherichia coli*, as reported in FIGS. 2A and 2B.

FIGS. 2A and 2B show two petri dishes, each one divided into eight portions. In both FIGS. 2A and 2B, each one of the eight portions of the petri dishes corresponds to a different concentration of co-polymer tested. As can be observed from FIGS. 2A and 2B, the tested concentrations of the quaternized co-polymer of Example 2 were: 0.0195 g/L, 0.039 g/L, 0.078 g/L, 0.156 g/L, 0.3125 g/L, 0.625 g/L, 1.25 g/L and 2.5 g/L.

As it can be seen from the Figures, the antimicrobial effect on *Staphylococcus aureus* is achieved even with very low concentrations of the co-polymer (starting from 0.0195 g/L) and the effect on *Escherichia coli* starts from 1.25 g/L and is very satisfying at 2.5 g/L.

The invention claimed is:

1. A method for providing an anti-microbial and an anti-pilling effect and for improving dye uptake to a textile, said method comprising
    (i) treating said textile with an aqueous solution comprising
        a) at least one co-polymer made of a monomer of general formula (I)

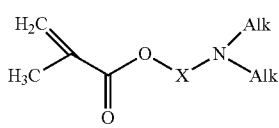

or mixture thereof,
and a monomer of general formula (II)

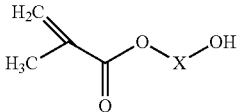

or mixture thereof,
wherein
    X is, each independently selected from the following (A) or (B) chains

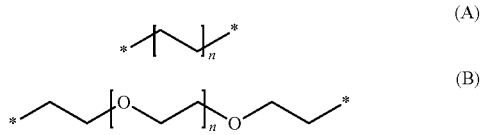

the stars indicate the bonds linked to the oxygen and nitrogen atoms in the monomers of formula (I) and formula (II);
n is, each independently, an integer from 1 to 10; and
Alk is a $C_1$-$C_4$ alkyl group;
and wherein the tertiary amino groups in formula (I) are partially quaternized with halo-long chain alkyl groups;
and
b) at least one aliphatic or cycloaliphatic diisocyanate; and
(ii) optionally drying and/or fixing said textile,
wherein said treating (i) creates urethane bridges which covalently bind said co-polymer to the textile; and
wherein the aqueous solution comprises a co-polymer that is made up of 2-(dimethylamino)ethyl methacrylate (DMAEMA) and 2-hydroxyethyl methacrylate (HEMA) and wherein the molar DMAEMA/HEMA ratio is 95-85/5-15 and 20-40% of the tertiary amino groups are quaternized.

2. The method of claim 1, wherein Alk is a linear or branched, saturated $C_1$-$C_4$ alkyl group.

3. The method of claim 1, wherein n is an integer from 1 to 8.

4. The method of claim 1, wherein the nitrogen atom in formula (I) is quaternized to provide a monomer of formula (I')

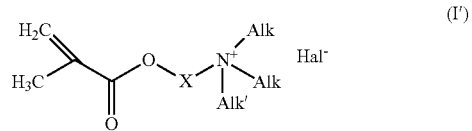

wherein X and Alk are as above defined, Alk" is a $C_6$ to $C_{22}$ alkyl group, and Hal⁻ indicates a halogen counter ion.

5. The method of claim 1, wherein said aliphatic or cycloaliphatic diisocyanate is selected from hexamethylene diisocyanate, isophorone diisocyanate, methylene-bis(4-cyclohexylisocyanate) and blocked aliphatic or cycloaliphatic diisocyanates.

6. The method of claim 1, wherein said textile is selected from any material suitable to prepare fabrics and garments, yarns, ready for dyeing fabrics, any textile articles, and garment articles.

7. The method of claim 6, wherein said textile is denim.

\* \* \* \* \*